US007738125B2

(12) United States Patent
Izumikawa

(10) Patent No.: US 7,738,125 B2
(45) Date of Patent: Jun. 15, 2010

(54) IMAGE PROCESSING APPARATUS, IMAGE FORMING APPARATUS, AND COMPUTER PRODUCT

(75) Inventor: Manabu Izumikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1005 days.

(21) Appl. No.: 11/349,231

(22) Filed: Feb. 8, 2006

(65) Prior Publication Data

US 2006/0209332 A1 Sep. 21, 2006

(30) Foreign Application Priority Data

Mar. 18, 2005 (JP) ............................ 2005-080239

(51) Int. Cl.
*G06K 15/00* (2006.01)
*G06F 3/12* (2006.01)

(52) U.S. Cl. ....................... 358/1.14; 358/1.9; 358/1.15

(58) Field of Classification Search .................. 358/1.1, 358/1.2, 1.3, 1.4, 1.5, 1.6, 1.7, 1.8, 1.9, 1.11, 358/1.13, 1.14, 1.15, 1.18, 437, 468, 474; 399/1, 8, 9, 18, 366; 347/2, 3, 5, 14, 23
See application file for complete search history.

(56) References Cited

U.S. PATENT DOCUMENTS

| | | | | |
|---|---|---|---|---|
| 4,281,921 | A * | 8/1981 | Van Auken | 355/77 |
| 6,901,236 | B2 * | 5/2005 | Saitoh et al. | 399/366 |
| 2003/0179399 | A1 * | 9/2003 | Matsunoshita | 358/1.13 |
| 2003/0179412 | A1 * | 9/2003 | Matsunoshita | 358/3.28 |
| 2004/0184065 | A1 * | 9/2004 | Guan et al. | 358/1.14 |
| 2005/0141907 | A1 | 6/2005 | Izumikawa et al. | |
| 2007/0133035 | A1 * | 6/2007 | Kondo et al. | 358/1.14 |

FOREIGN PATENT DOCUMENTS

| | | | |
|---|---|---|---|
| GB | 2096055 | A * | 10/1982 |
| JP | 6-125459 | | 5/1994 |
| JP | 7-36317 | | 2/1995 |
| JP | 7-87309 | | 3/1995 |
| JP | 7-131636 | | 5/1995 |
| JP | 07-288680 | | 10/1995 |
| JP | 9-164739 | | 6/1997 |
| JP | 11-32213 | | 2/1999 |
| JP | 2001-86330 | | 3/2001 |
| JP | 2001-197297 | | 7/2001 |
| JP | 2001-218033 | | 8/2001 |
| JP | 2004-279676 | | 10/2004 |

* cited by examiner

*Primary Examiner*—Dov Popovici
(74) *Attorney, Agent, or Firm*—Oblon, Spivak, McClelland, Maier & Neustadt, P.C.

(57) ABSTRACT

In an image processing apparatus, a document is read to obtain image data of the document, and a color material of an image forming unit is selected. If it is detected that reproduction of a document is prohibited, a document distinction disabling process, which inhibits reproduction of the document, is applied to the image data of the document using selected color material, and the image data subjected to the document distinction disabling process is sent to the image forming unit to form an output of the image data.

21 Claims, 9 Drawing Sheets

| | Y | M | C | K |
|---|---|---|---|---|
| FULL-COLOR PRINTING | 1 | 1 | 1 | 1 |
| BK PRINTING | 0 | 0 | 0 | 1 |
| RED-BLACK PRINTING | 1 | 1 | 0 | 1 |
| TOTAL | 2 | 2 | 1 | 3 |

IMAGE PROCESSING APPARATUS, IMAGE FORMING APPARATUS, AND COMPUTER PRODUCT

CROSS-REFERENCE TO RELATED APPLICATIONS

The present document incorporates by reference the entire contents of Japanese priority document, 2005-080239 filed in Japan on Mar. 18, 2005.

BACKGROUND OF THE INVENTION

1. Field of the Invention

The present invention relates to an image processing apparatus, an image forming apparatus, and a computer product.

2. Description of the Related Art

In recent years, with the improvement of an image processing technology and an image forming technology, banknotes, marketable securities, or the like are copied so faithfully using a digital color copying machine or a digital color multifunction device, that the genuine banknote, security, or the like cannot be easily distinguished from a copy thereof. Therefore, it is necessary to take measures to make it totally impossible to copy or make it impossible to correctly copy special documents such as the banknote and the security.

For example, even in case of general company documents other than the special documents such as the banknotes and the security, there are a large number of confidential documents that are prohibited from being outputted by means of copying and the like. Thus, it is necessary to take measures to make it totally impossible to copy or make it impossible to correctly copy such confidential documents also.

Under such circumstances, conventionally, various inventions have been made to restrain copying of documents such as the special documents and the confidential documents that are prohibited from being reproduced. Specific examples of such inventions are described below.

There are various methods of distinguishing the special documents such as the banknotes and the securities. Japanese Patent Application Laid-Open No. H6-125459 and Japanese Patent Application Laid-Open No. 2001-86330 disclose a method of comparing input image data of a document and a specific mark (pattern data) registered in advance according to a pattern matching method, and if the specific mark is present in the image data, judging that the document is a special document is proposed. Upon judging that the document is the special document, it is easy to prohibit copying of the document, that is, prevent copying the document.

As an example of a technology for distinguishing the confidential documents prohibited from being copied, Japanese Patent Application Laid-Open No. H7-36317 and Japanese Patent Application Laid-Open No. H7-87309 disclose inventions for detecting a mark, which is attached to a confidential document for indicating the confidentiality of the document. The inventions make use of the fact that, in general, the mark including a confidentiality seal, a copy prohibit mark, or the like is put on the confidential documents prohibited to be copied. When it is judged that a document is a confidential document, it is easy to prevent the document from being copied.

Japanese Patent Application Laid-Open No. H9-164739 and Japanese Patent Application Laid-Open No. 2001-197297 disclose techniques for controlling copying by embedding a base pattern in a document image desired to be prohibited from being copied. In the techniques, a sheet having a base pattern including a base area and a message area formed thereon as a background is used as a sheet for a document image. The base pattern is not so conspicuous in the document image, and does not hinder reading or the like of information included in the document image. However, when the document image embedded with such a base pattern is copied, for example, a pattern of the message area emerges. Thus, for example, if characters “copy prohibited” are given as the pattern of the message area, it is quite obvious that a copy of the document is a confidential document prohibited from being copied. Consequently, it is possible to psychologically restrain a person from copying the document.

Another technique of controlling copying by embedding a base pattern in a document image desired to be prohibited from being copied, is a technique of applying document distinction disabling processing for painting out a document image with solid when the document image is copied.

However, in this technique, there can be problems as described below.

In the document distinction disabling processing for painting out a document image with solid when the document image is copied, only a fixed color is used as a color material necessary for the solid color. In other words, a degree of decrease in the color material used for the document distinction disabling processing is large compared with those of other color materials. Therefore, when the color material used for the document distinction disabling processing frequently used, general use of the color material is hindered.

SUMMARY OF THE INVENTION

It is an object of the present invention to at least solve the problems in the conventional technology.

According to one aspect of the present invention, an image processing apparatus that generates image data based on an input image of a document read by an image reading unit, and sends the image data to an image forming unit that forms an output image using a plurality of color materials, the image processing apparatus includes a detecting unit that detects, from the image data of the document, whether reproduction of the document is prohibited; a color material selecting unit that selects a color material to be used in a document distinction disabling process that is applied to the image data to inhibit reproduction of the document; a document distinction disabling processing unit that applies the document distinction disabling process to the image data using selected color material, if it is detected that reproduction of the document is prohibited; and an image data outputting unit that outputs, to the image forming unit, the image data subjected to the document distinction disabling process.

According to another aspect of the present invention, an image forming apparatus includes an image forming unit that forms an output image with a plurality of color materials; an image reading unit that reads an input image of a document to generate image data; a detecting unit that detects, from the image data of the document, whether reproduction of the document is prohibited; a color material selecting unit that selects a color material to be used in a document distinction disabling process that is applied to the image data to inhibit reproduction of the document; a document distinction disabling processing unit that applies the document distinction disabling process to the image data using selected color material, if it is detected that reproduction of the document is prohibited; and an image data outputting unit that outputs, to the image forming unit, the image data subjected to the document distinction disabling process.

According to still another aspect of the present invention, a computer-readable recording medium that records thereon a computer program for an image processing apparatus that forms an output image of a document using a plurality of color materials, the computer program including instructions which, when executed, cause the computer to execute reading an input image of a document to generate image data; detecting, from the image data of the document, whether reproduction of the document is prohibited; selecting a material to be used in a document distinction disabling process that is applied to the image data to inhibit reproduction of the document; applying the document distinction disabling process to the image data using selected color material, if it is detected that reproduction of the document is prohibited; and outputting the image data subjected to the document distinction disabling process to an image forming unit that forms the output image of the image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A first embodiment of the present invention is explained with reference to FIGS. 1 to 7.

Figure 1:
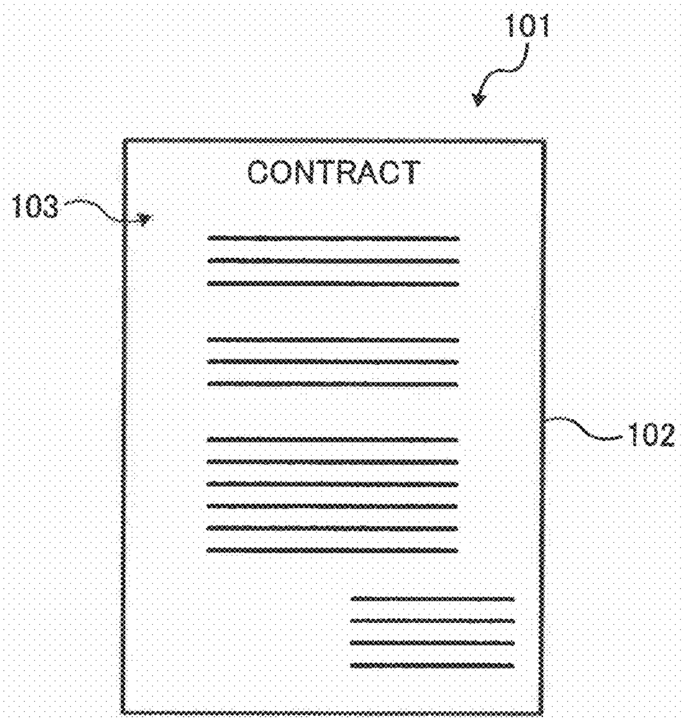
FIG. 1 is a plan view of an example of a document used in a first embodiment of the present invention.
Figure 2:
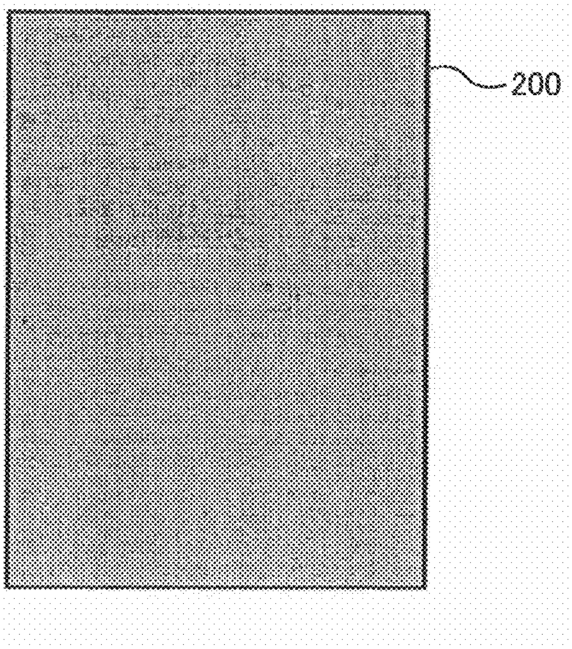
FIG. 2 is a plan view of an example of a copy of a document image to which document distinction disabling process is applied.

FIG. 1 is a plan view of an example of a document used in this embodiment. FIG. 2 is a plan view of an example of a copy of a document image to which document distinction disabling process is applied. In the example shown in FIG. 1, a document sheet 102 is used for preparing a document 101, which is a contract document. A dot pattern 103, which indicates that reproduction of the document is prohibited, is embedded as a background in the document sheet 102. Actually, the dot pattern 103 is not so conspicuous in the document 101, and does not hinder reading or the like of information included in the document 101. As another embodiment, it is also possible that the document sheet 102 not having the dot pattern 103 formed thereon is used, and the dot pattern 103 is formed simultaneously with preparation of the document 101 of the contract. In other words, the dot pattern 103 may be printed and formed on the document sheet 102 in advance or may be formed as an image simultaneously with forming an image of the characters, the figures, or the like on the document sheet 102.

The "dot pattern" means some base pattern embedded in a background image or a front image included in image data of a document, that is, some base pattern formed by dots. In this case, the dots simply mean dots forming an image, the pattern itself does not have to be a pattern of the dots. For example, a thin line pattern, a specific pattern, and the like formed by a set of dots could be a dot pattern.

When the document 101 created using such a document sheet 102 is copied by a digital color multifunction device 1 or the like, as shown in FIG. 2, the document 101 is outputted in a state in which the document distinction disabling process for, for example, painting out a transfer sheet 200 with solid, is applied to the document 101. When the document 101 embedded with the dot pattern 103 is copied in this way, since the document distinction disabling process for painting out a document image with solid is applied to the document 101, it is possible to prohibit copying of documents such as confidential documents and special documents (banknotes and securities).

Figure 3:
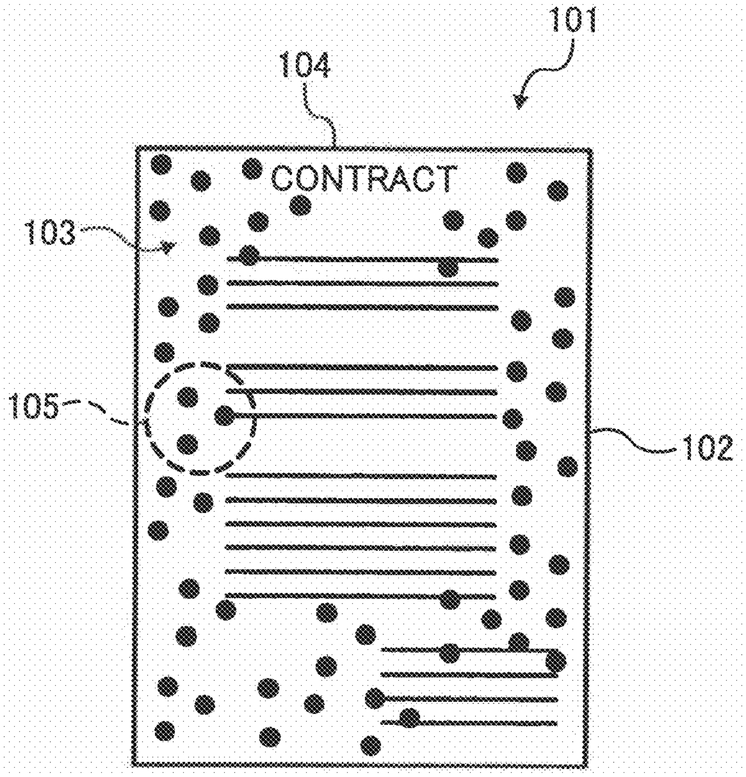
FIG. 3 is a plan view of an example of a document in which a dot pattern is visible.
Figure 4:
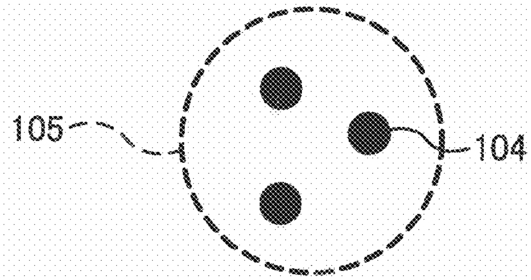
FIG. 4 is an enlarged diagram of the dot pattern shown in FIG. 3.

The dot pattern 103 causing such a phenomenon may be formed of, for example, dots 104 having same size. In this embodiment, as shown in FIGS. 3 and 4, a dot pattern 105 formed of a plurality of dots 104 is set as a unit, and the dot pattern 103 is formed by arranging a plurality of dot patterns 105. FIG. 3 is a plan view of an example of a document in which the dot pattern 103 is visible. FIG. 4 is an enlarged diagram of the dot pattern 105 shown in FIG. 3. The dot pattern 105 shown in FIGS. 3 and 4 is a pattern in which three isolated black dots 104 are present in a predetermined space arrangement (positional relation). Therefore, in this embodiment, the dot pattern 105 formed by the dots 104 is detected by pattern matching. With density of the dot pattern 105 as a characteristic amount, it is judged whether reproduction of the document is prohibited.

In an example explained in this embodiment, the present invention is applied to, as an image processing apparatus and an image forming apparatus, a digital color multifunction device that is generally called a Multi Function Peripheral (MFP) which includes a copy function, a facsimile (FAX) function, a print function, a scanner function, a function for distributing an input image (a document image read by the scanner function or an image inputted by the FAX function), and the like.

Figure 5A:
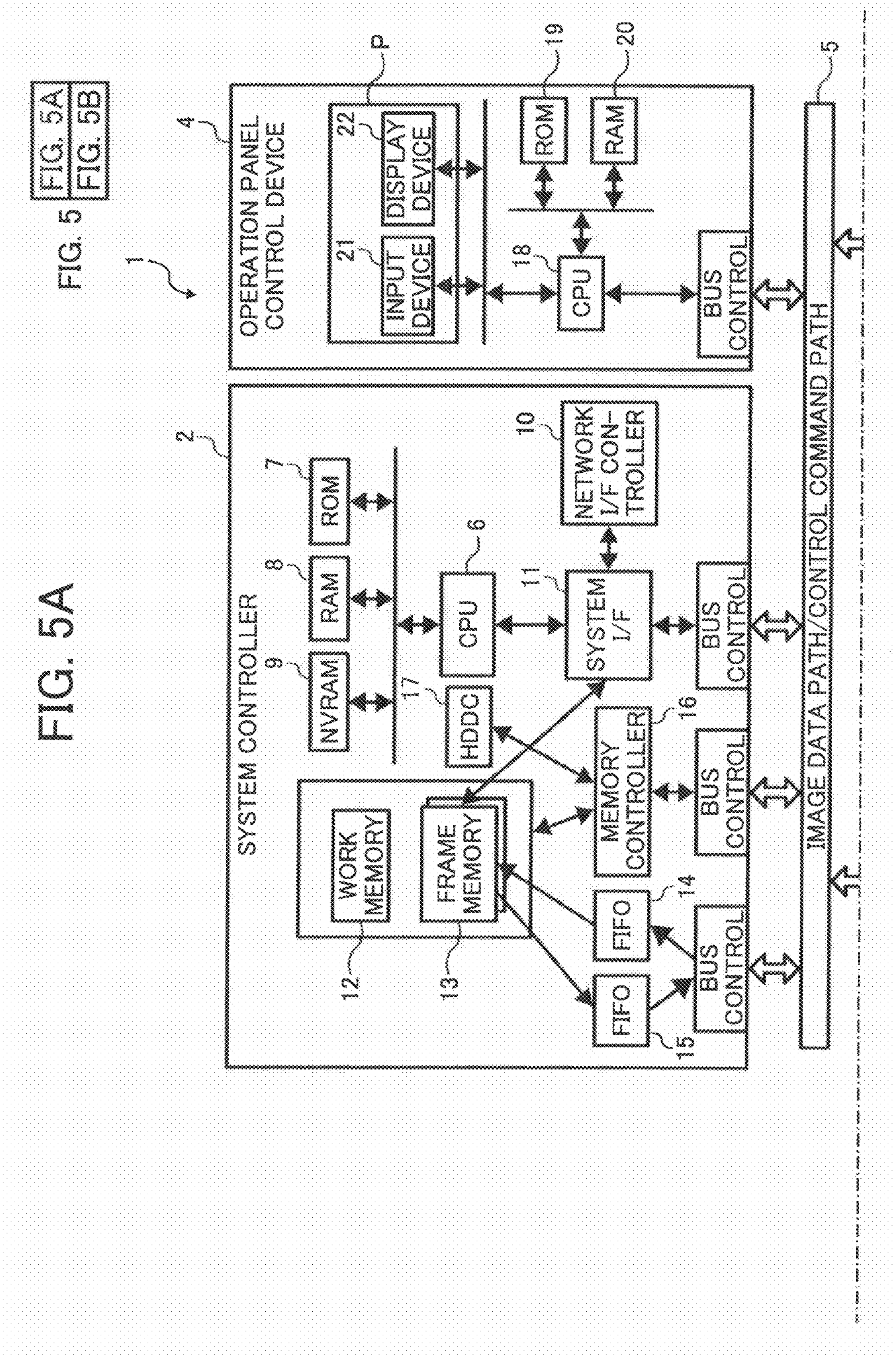
FIG. 5 is a block diagram of a control system for controlling a digital color multifunction device.
Figure 5B:
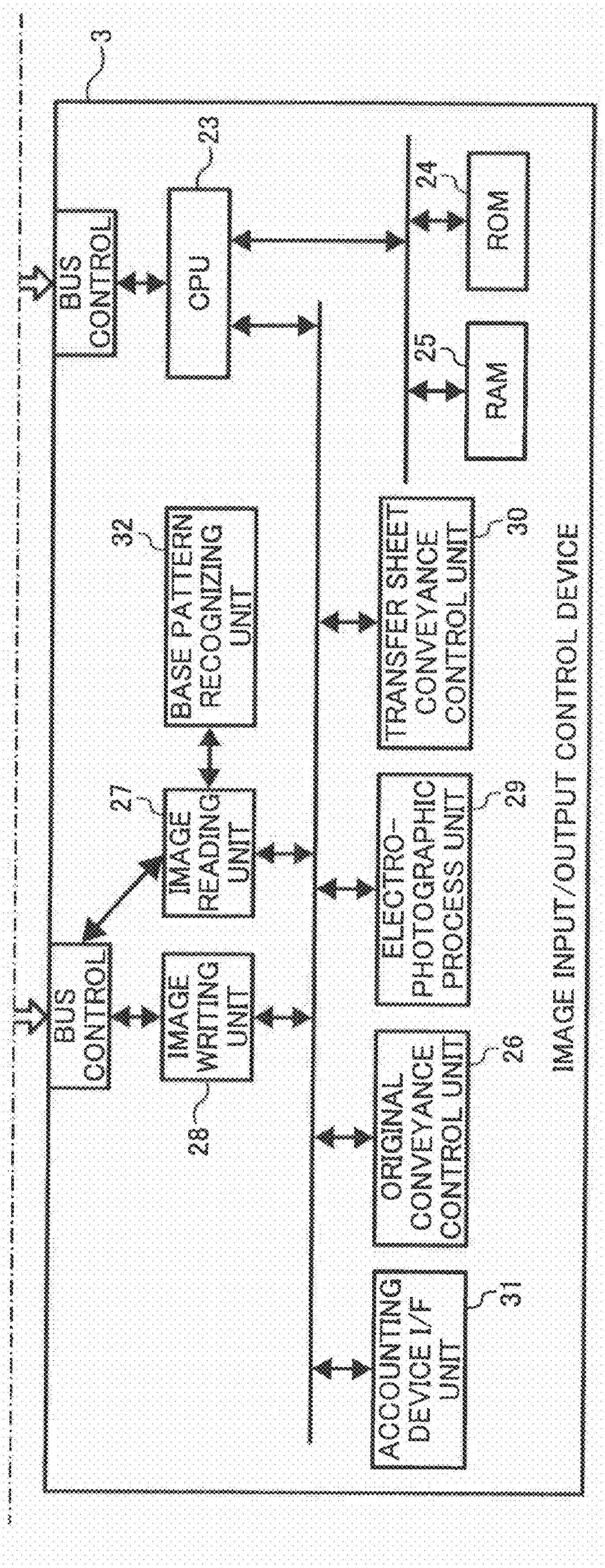

FIG. 5 is a block diagram of a control system for controlling the digital color multifunction device 1. The digital color multifunction device 1 in this embodiment includes a system controller 2 that controls the entire system. The system controller 2 controls an image input/output control device 3 that reads a document image and writes an image on a transfer sheet according to a publicly-known electro-photographic technology, and an operation panel control device 4 that controls an operation panel P for inputting a setting for this system and displaying a system state. The image input/output control device 3, the operation panel control device 4, and the system controller 2 are connected by an image data path/control command path 5 through which image data and control commands are transmitted in space time.

The system controller 2 mainly includes a Central Processing Unit (CPU) 6 that controls the entire system controller, a Read Only Memory (ROM) 7 having stored therein a control program for the system controller 2, a Random Access Memory (RAM) 8 that is a work memory of the CPU 6, and a Non Volatile Random Access Memory (NVRAM) 9 that stores information on the entire system. Such a system controller 2 executes one or more of a plurality of applications such as a scanner application, a copy application, a FAX application, and a printer application.

Further, the system controller 2 includes a network I/F controller 10 that controls connection to a network (not shown), a system I/F 11, a work memory 12 that is a work memory for image expansion used in a printer function, a frame memory 13 that is a work memory for storing image data of a read image and a written image, First-In First-Out (FIFO) buffers 14 and 15, a memory controller 16, and a High Density Digital Cassette (HDDC) 17.

The system I/F 11 performs transfer control for FAX data and printer data that are processed in the system based on an instruction of the CPU 6.

The FIFO buffer 14 performs data transfer speed conversion when an input image is written in the frame memory 13. Similarly, the FIFO buffer 15 performs speed conversion when image data in the frame memory 13 is transferred as an output image.

The memory controller 16 independently controls the bus, and input and output of images between the frame memory 13 and the HDDC 17, without control of the CPU 6.

The HDDC 17 includes a Hard Disk Drive (HDD) and controls input and output of image data to and from the HDD. An image read by an image reading unit 27 and an image acquired through a network are stored in the HDD.

The operation panel control device 4 mainly includes a CPU 18 that controls the entire operation panel control device 4, a ROM 19 having stored therein a control program for the operation panel control device 4, and a RAM 20 that is a work memory of the CPU 18. An operation panel P includes an input device 21 and a display device 22. The input device 21 is, for example, a touch panel, and is a device with which a user inputs a system setting. The display device 22 may be a Liquid Crystal Display (LCD) and displays a setting and a state of the system to allow the user to check the setting and the state.

The image input/output control device 3 mainly includes a CPU 23 that controls the entire image input/output control device 3, a ROM 24 having stored therein a control program for the image input/output control device 3, and a RAM 25 that is a work memory of the CPU 23.

Further, the image input/output control device 3 includes a document conveyance control unit 26, an image reading unit 27, an image writing unit 28, an electro-photographic process unit 29, a transfer sheet conveyance control unit 30, and an accounting device I/F 31.

The document conveyance control unit 26 conveys documents, which are read by the image reading unit 27 from a stacked plurality of documents, one by one. The document conveyance control unit 26 also detects a size of the documents.

The image reading unit 27 controls an optical scanner that causes lamp light to reflect on a document conveyed by the document conveyance control unit 26, and reads the lamp light with a Charge Coupled Device (CCD).

The image writing unit 28 controls an optical writing device that lights a laser beam at a pixel frequency and performs scanning with a polygon scanner using the laser beam. The electro-photographic process unit 29 controls a well-known electrophotographic technology for visualizing with a toner, a latent image written on a photosensitive member by the laser beam, transferring a toner image onto a sheet, and fixing the toner image on the sheet. The electro-photographic process unit 29 in this embodiment is an electro-photographic process unit of a tandem type in which image processing units for color materials of four color toners of black (K), yellow (Y), magenta (M), and cyan (C) are arranged in series. The electro-photography is only an example. The present invention is also applicable to an ink-jet type image forming method. In other words, the image writing unit 28 and the electro-photographic process unit 29 are image forming units.

The transfer sheet conveyance control unit 30 performs conveyance control for a transfer sheet onto which an image is transferred by the electro-photographic process unit 29.

The accounting device I/F 31 converts an instruction of the CPU 23 into a dedicated I/F of an accounting device (not shown) to connect the image input/output control device 3 and the accounting device, and transmits and receives printing conditions and charging and printing availability signals to and from the accounting device.

The image input/output control device 3 in this embodiment also includes a base pattern recognizing unit 32 that performs ting block pattern recognition. The base pattern recognizing unit 32 functions as a reproduction prohibited document detecting unit. The base pattern recognizing unit 32 applies ting pattern recognition to binarized image data sent by the image reading unit 27, judges whether reproduction of a target document is prohibited, and sends a result of the judgment to the image reading unit 27.

Figure 6:
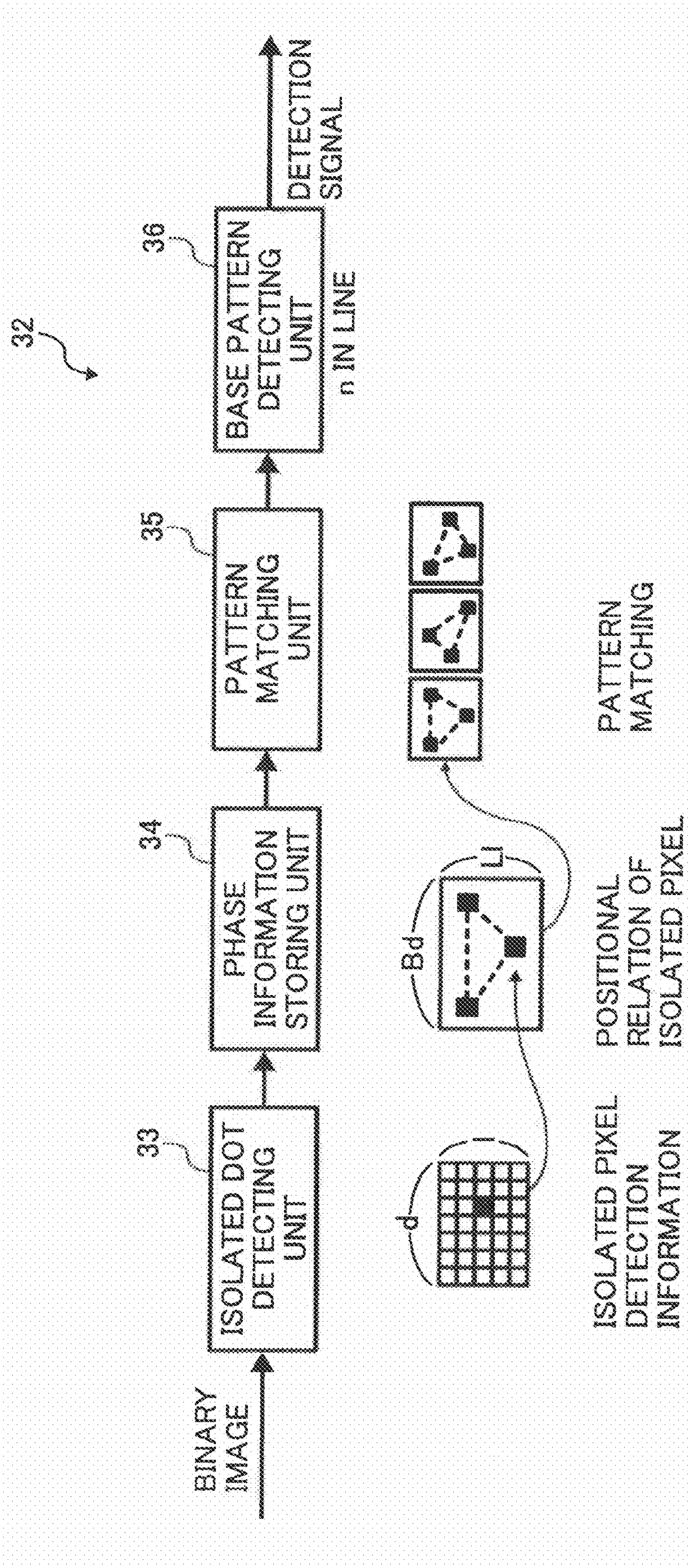
FIG. 6 is a block diagram of a base pattern recognizing unit.

FIG. 6 is a block diagram of the base pattern recognizing unit 32. As shown in FIG. 6, the base pattern recognizing unit 32 includes an isolated dot detecting unit 33, a phase information storing unit 34, a pattern matching unit 35, and a base pattern detecting unit 36.

Binarized image data is sent to the isolated dot detecting unit 33 by the image reading unit 27. The isolated dot detecting unit 33 detects an isolated pixel in an area of main scanning d pixels×sub-scanning one line. The isolated dot detecting unit 33 sends detection information of the isolated pixel to the phase information storing unit 34 together with the image data.

The phase information storing unit 34 stores a positional relation of the isolated pixel in Bd×L1 blocks where Bd=main scanning d pixels×B, L1=sub-scanning 1 line×L) from the isolated pixel information.

The pattern matching unit 35 performs matching of the positional relation information of the isolated pixel in the Bd×L1 blocks stored in the phase information storing unit 34, and a predetermined base pattern. In this embodiment, the dot pattern 105, in which the three isolated black dots 104 are present in the predetermined space arrangement (positional relation) as shown in FIGS. 3 and 4, is detected by pattern matching. The pattern matching unit 35 sends a result of the pattern matching to the base pattern detecting unit 36.

When the base pattern detecting unit 36 recognizes that the dot pattern is a base pattern according to detection of matching of predetermined 'n' patterns in the sub-scanning line, the base pattern detecting unit 36 outputs a detection signal (a base pattern detection result) to the image reading unit 27.

The isolated dot detecting unit 33 and the pattern matching unit 35 are required to have predetermined or higher resolution at the time of document reading. If resolution of document image data is lower than the predetermined resolution, it is not possible to detect a base pattern because of interference of pixels.

The image reading unit 27 receives the base pattern detection result. The image reading unit 27 fixes the image data to predetermined gradation and phase in response to an instruction from the CPU 23 according to the control program stored in the ROM 24 based on the base pattern detection result sent by the base pattern recognizing unit 32. The image reading unit 27 applies image processing (document distinction disabling process) to the image data to make it impossible to read a read document image (a document distinction disabling processing unit).

In this embodiment, the document distinction disabling process based on the base pattern detection result from the base pattern recognizing unit 32 in the image reading unit 27 is a process for painting out a document image obtained by reading the document 101 with the image reading unit 27 with solid using only a predetermined color. In other words, when the image data subjected to such processing is outputted to the image writing unit 28 (an image data outputting unit) and printed by the electro-photographic process unit 29, as shown in FIG. 2, the image data is outputted in a state in which the image data is subjected to the document distinction disabling process, for example, painting out the transfer sheet 200 with solid. When the base pattern is recognized in this way, because the document distinction disabling process is applied to the document image read by the image reading unit 27, it is possible to prohibit copying of a reproduction prohibited document.

In the document distinction disabling process of painting out a document image with solid when the document image is copied, only a single color is used as a color material necessary for solid. In the electro-photographic process unit 29, a degree of decrease in a color material used for the document distinction disabling process is large compared with those of other color materials. Therefore, when the color material used for the document distinction disabling process is frequently used by the user, general usage of the color material is hindered.

Thus, in the digital color multifunction device 1 in this embodiment, the CPU 23 of the image reading unit 27 operates according to the control program stored in the ROM 24 to change a color material color used for the document distinction disabling process. More specifically, when the document distinction disabling process is performed by the image reading unit 27, a color material of a color instructed by the system controller 2 is used. Color selection process in the document distinction disabling process, which is a characteristic function of the digital color multifunction device 1 in this embodiment, is explained below with reference to a flowchart in FIG. 7.

Figure 7:
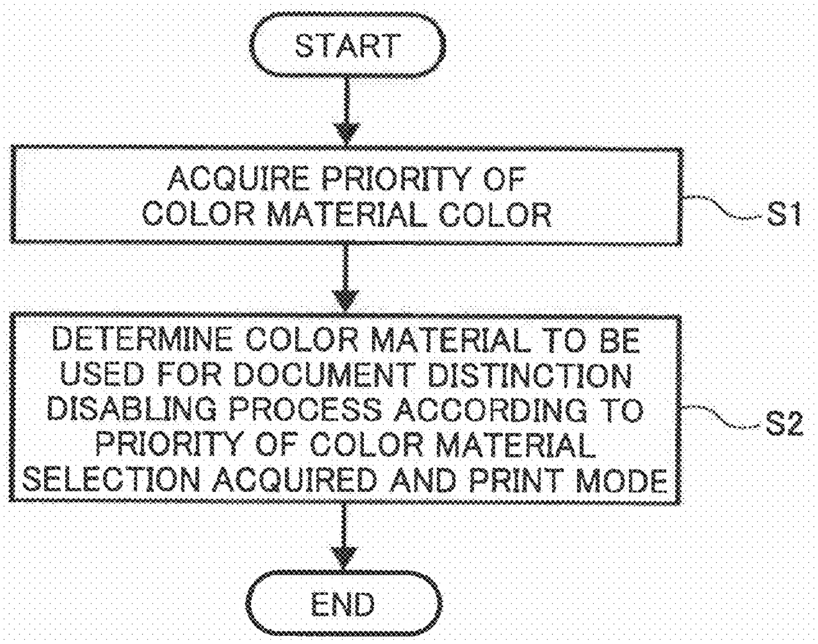
FIG. 7 is a flowchart of a color selection process in the document distinction disabling process.

As shown in FIG. 7, when the color selection process in the document distinction disabling process starts, the CPU 23 acquires the priority of color material color selection stored in the NVRAM 9 of the system controller 2 (step S1).

When the priority of color material color selection is acquired, the CPU 23 determines a color material color to be used for the document distinction disabling process based on a print mode (step S2). For example, when the priority of color material color selection from the system controller 2 is in an order of black (K), yellow (Y), magenta (M), and cyan (C), because a copy image is formed using all the colors of Y, M, C, and K in the case of a full-color copy mode, a K (black) toner with a first priority is selected for the document distinction disabling process. In the case of a red single color mode, since a copy image is formed using Y and M colors, a Y (yellow) toner with a second priority is selected for the document distinction disabling process.

Thereafter, a color material with a highest priority is selected out of color materials used for document reproduction. The document distinction disabling process is applied to a document image using the color material selected in this way.

As described above, according to this embodiment, a color material color of the image forming unit is selected for applying the document distinction disabling process to image data for making it impossible to reproduce the document. When it is detected that reproduction of a document is prohibited, the document distinction disabling process is applied to the image data using the color material color of the image forming unit selected, and the image data is outputted to the image forming unit. Consequently, when processing for painting out a document image with solid is applied as the document distinction disabling process, compared with the method of using only a fixed color material for solid, it is possible to reduce offset of a color material usage amount by making it possible to select a color material color for applying the document distinction disabling process.

A second embodiment of the present invention is explained with reference to FIG. 8. Components identical with those in the first embodiment are denoted by the identical reference numerals and signs. Explanation of the components is omitted. In the first embodiment, a color material color used for the document distinction disabling process is determined on the basis of the priority of color material color selection stored in the NVRAM 9 of the system controller 2. However, a priority of color material color selection is not limited to such fixed priority. In the second embodiment, a color of a color material with a largest residual amount in the electro-photographic process unit 29 is preferentially set as a color material color to be used for the document distinction disabling process.

The electro-photographic process unit 29 in this embodiment periodically notifies the system controller 2 of toner residual amounts of respective color materials (a residual amount notice receiving unit). The technology disclosed in Japanese Patent Application Laid-Open No. 2002-287477 may be used as a method of detecting toner residual amounts. In the method, briefly, a light-emitting member like a light-emitting diode for generating an infrared ray and a light-receiving member like a photodiode for detecting the infrared ray from the light-emitting member passing through a container are arranged outside a toner container. Toner residual amounts are judged according to a level and a fluctuation state of a light detection signal of the light-receiving member.

When the system controller 2 is notified of the toner residual amounts of the respective color materials from the electro-photographic process unit 29, the system controller 2 judges a color material with a largest toner residual amount and stores the color material in the NVRAM 9.

The color selection process in the document distinction disabling process executed by the CPU 23 of the image reading unit 27 according to the control program stored in the ROM 24 is explained with reference to a flowchart in FIG. 8.

Figure 8:
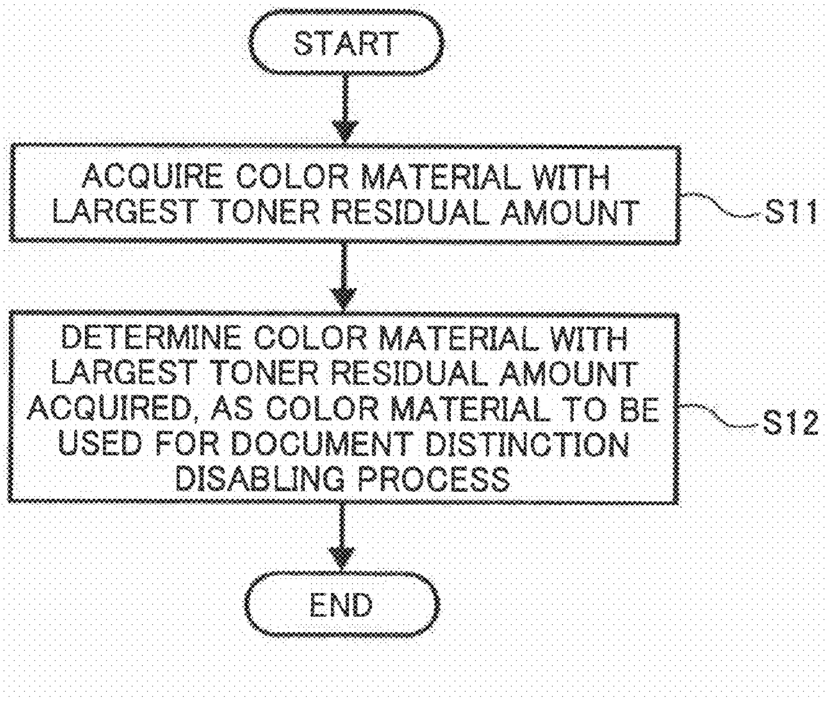
FIG. 8 is a flowchart of a color selection process in a document distinction disabling process according to a second embodiment.

As shown in FIG. 8, when the color selection process in the document distinction disabling process starts, the CPU 23 acquires the color material with a largest toner residual amount stored in the NVRAM 9 of the system controller 2 (step S11: a largest residual amount color material acquiring unit).

When the color material with a largest toner residual amount is acquired, the CPU 23 determines that a color of the color material with a largest toner residual amount should be used for the document distinction disabling process (step S12: a color material color selecting unit).

Thereafter, the document distinction disabling process is applied to a document image using the color material with a largest toner residual amount thus selected.

As described above, according to this embodiment, a color material with a largest residual amount is acquired from color materials of a plurality of colors, and a color of the color material with a largest residual amount acquired among the color materials of the colors in the image forming unit is selected as a color material color. Thus, it is possible to surely reduce offset of a color material usage amount.

A third embodiment of the present invention is explained with reference to FIGS. 9 and 10. Components identical with those in the first embodiment are denoted by the identical reference numerals and signs. Explanation of the components is omitted. In the first embodiment, a color material color used for the document distinction disabling process is determined on the basis of the priority of color material color selection stored in the NVRAM 9 of the system controller 2. However, a priority of color material color selection is not limited to such fixed priority. In the third embodiment, a color of a color material with a smallest usage frequency in the electro-photographic process unit 29 is preferentially set as a color material color used for the document distinction disabling process.

The electro-photographic process unit 29 in this embodiment periodically notifies the system controller 2 of frequencies of use of respective color materials (a usage frequency notice receiving unit).

The frequencies of use of the respective color materials periodically notified by the electro-photographic process unit 29 are stored in the NVRAM 9 of the system controller 2 as cumulative data. The system controller 2 judges a color material with a smallest usage frequency based on the cumulative data, and stores the color material in the NVRAM 9.

As an example, the number of times of image formation can be an indicator of a usage frequency of a color material. Specifically, it is possible to calculate the number of times of image formation with the respective color materials by storing the number of times of execution of respective print modes (a full-color print mode, a Bk print mode, and a red-black print mode). FIG. 9 is a table of an example of calculating the numbers of times of image formation based on the numbers of times respective print modes are executed. According to the example in FIG. 9, the full-color print mode, the Bk print mode, and the red-black print mode are executed once, respectively. The numbers of times of image formation are two times for a color material Y, a color material M, and a color material C, and three times for a color material K. According to the example in FIG. 9, it is seen that the usage frequency is high for the color material K and is low for the color material C. Therefore, the color material C is selected as a color material with a smallest usage frequency. It is also possible to use an amount of writing in a photosensitive member by an LD as an indicator of usage frequency of a color material. Specifically, it is possible to calculate an amount of use of a color material based on a range, time, and intensity of irradiation of the LD on respective color photosensitive members.

The color selection process in the document distinction disabling process executed by the CPU 23 of the image reading unit 27 according to the control program stored in the ROM 24 is explained with reference to a flowchart in FIG. 10.

Figures 9, 10:
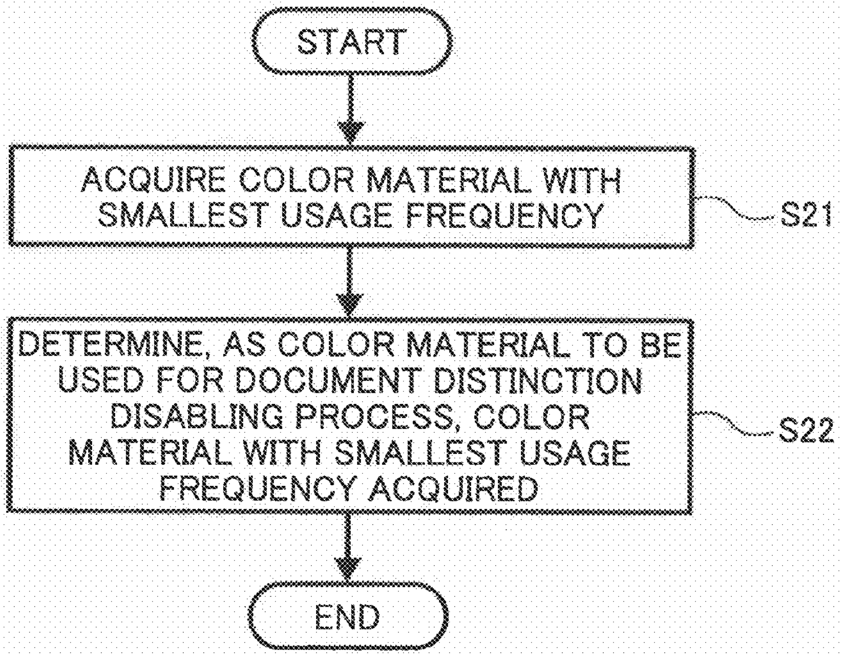
FIG. 9 is a table for explaining an example of calculating a number of times of image formation based on a execution of print modes according to a third embodiment.
FIG. 10 is a flowchart of a color selection process in the document distinction disabling process according to the third embodiment.

As shown in FIG. 10, when the color selection process in the document distinction disabling process starts, the CPU 23 acquires the color material with a smallest usage frequency stored in the NVRAM 9 of the system controller 2 (step S21: a smallest frequency color material acquiring unit).

When the color material with a smallest usage frequency is acquired, the CPU 23 determines a color of the color material with a smallest usage frequency as a color of a color material to be used for the document distinction disabling process (step S22: a color material color selecting unit).

Thereafter, the document distinction disabling process is applied to a document image using the color material with a smallest usage frequency thus selected.

As described above, according to this embodiment, a color material with a smallest usage frequency is selected out of color materials of a plurality of colors, and a color of the color material with a smallest usage frequency acquired among the color materials of the colors in the image forming unit is selected as a color material color. Thus, it is possible to surely reduce offset of a color material usage amount.

A fourth embodiment of the present invention is explained with reference to FIGS. 11 to 13. Components identical with those in the first embodiment are denoted by the identical reference numerals and signs. Explanation of the components is omitted. In the first embodiment, a priority of color material color selection is stored in the NVRAM 9 of the system controller 2 in advance, and a color material color used for the document distinction disabling process is determined according to the priority of color material color selection and a print mode. However, the fourth embodiment makes it possible to select a color material color used for the document distinction disabling process according to an intention of a user.

The operation panel control device 4 in this embodiment notifies the system controller 2 of a color material designated by the user via the operation panel P (a color material selecting unit, a user selection notice receiving unit). FIG. 11 is a plan view of an example of a color material color selection screen displayed on the operation panel P used for the document distinction disabling process. As shown in FIG. 11, on the color material color selection screen used for the document distinction disabling process, buttons B1 to B4 for designating colors of respective color materials are displayed on the display device 22 of the operation panel P. The user designates a color material used for the document distinction disabling process via the input device 21 serving as a touch panel.

The system controller 2 stores the color material designated by the user via the operation panel P in the NVRAM 9 in the system controller 2.

The color selection process in the document distinction disabling processing executed by the CPU 23 of the image reading unit 27 according to the control program stored in the ROM 24 is explained with reference to a flowchart in FIG. 12.

Figure 12:
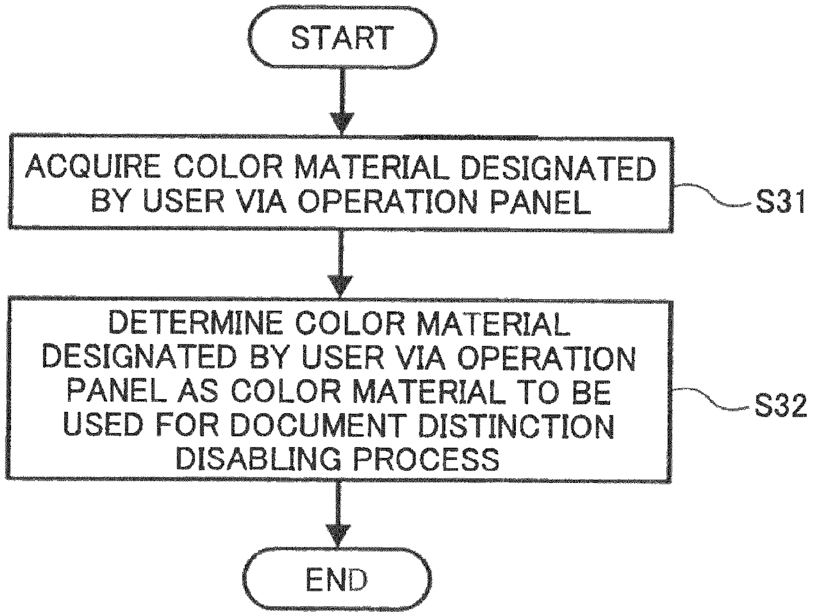
FIG. 12 is a flowchart of a color selection process in the document distinction disabling process.

As shown in FIG. 12, when the color selection process in the document distinction disabling process starts, the CPU 23 acquires the color material designated by the user via the operation panel P and stored in the NVRAM 9 of the system controller 2 (step S31: a selected color material acquiring unit).

When the color material designated by the user via the operation panel P is acquired, the CPU 23 determines a color of the color material designated by the user via the operation panel P as a color of a color material to be used for the document distinction disabling processing (step S32: a color material color selecting unit).

Thereafter, the document distinction disabling process is applied to a document image using the color material designated by the user via the operation panel P.

As described above, according to this embodiment, a desired color material selected by a user is acquired and a color of the desired color material selected by the user among color materials of a plurality of colors in the image forming unit is selected as a color material color. Thus, it is possible to perform the document distinction disabling process using a color material that the user estimates as having a large residual amount or that the user estimates as having a small usage frequency. Therefore, it is possible to reduce offset of a color material usage amount.

Figure 11:
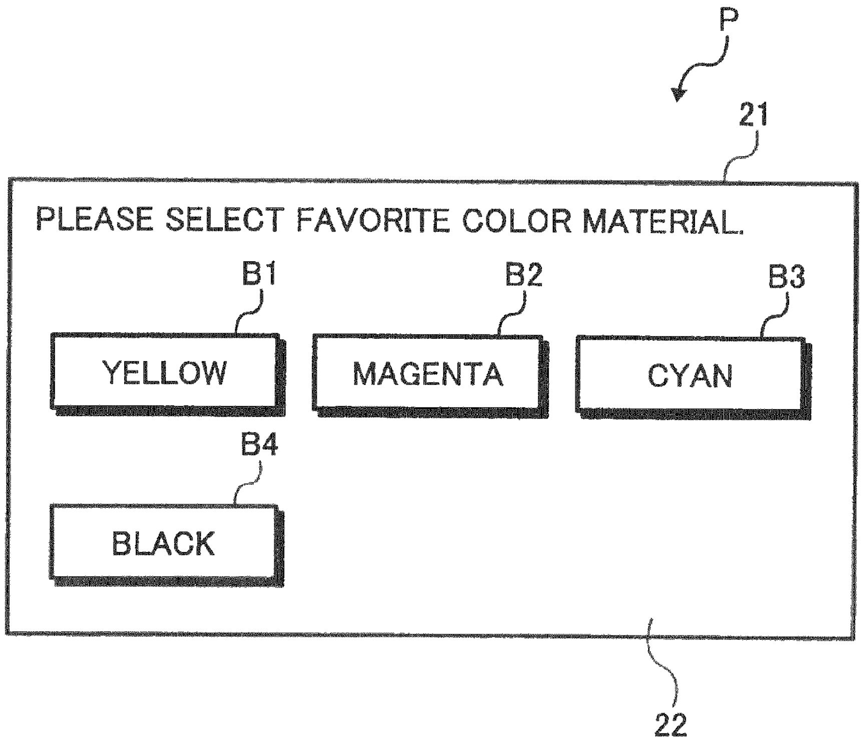
FIG. 11 is a plan view of an example of a color material color selection screen used for the document distinction disabling process and displayed on an operation panel according to a fourth embodiment.

It is possible to cause the NVRAM 9 of the system controller 2 to store the priority of color material color selection explained in the first embodiment by having the user operate the buttons B1 to B4 on the color material color selection screen shown in FIG. 11 according to a priority set for favorite color materials of the user.

Figure 13:
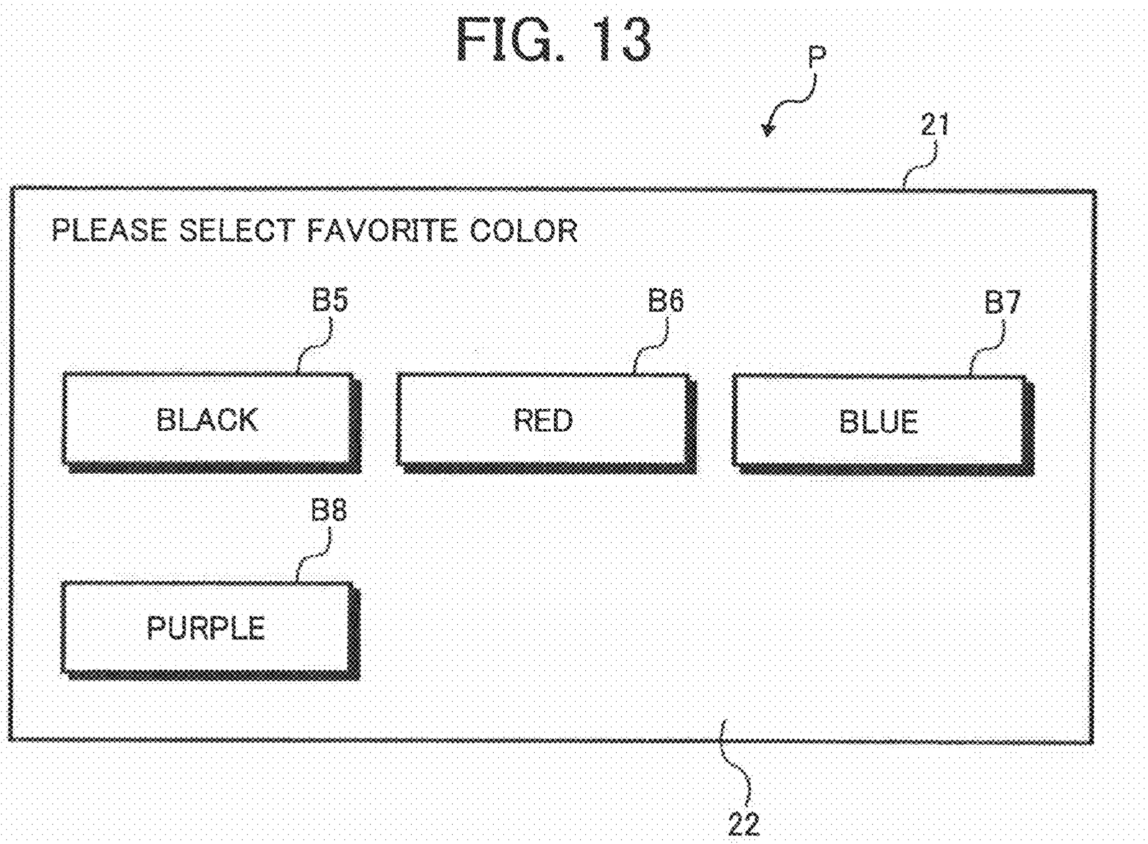
FIG. 13 is a plan view of another example of the color material color selection screen used for the document distinction disabling process and displayed on the operation panel.

Alternatively, as shown in FIG. 13, on the color material color selection screen used for the document distinction disabling process, buttons B5 to B8 for designating a color to be used for the document distinction disabling process can be displayed on the display device 22 of the operation panel P, and the user can designate a color used for the document distinction disabling process via the input device 21 serving as a touch panel. The system controller 2 is notified of a color material necessary for forming the color selected (a color selecting unit, a user selection notice receiving unit). For example, when the user designates purple using the button B8, it is evident for people around the apparatus that a reproduction prohibited document is being copied, and copying of the document is further restrained.

Figure 14:
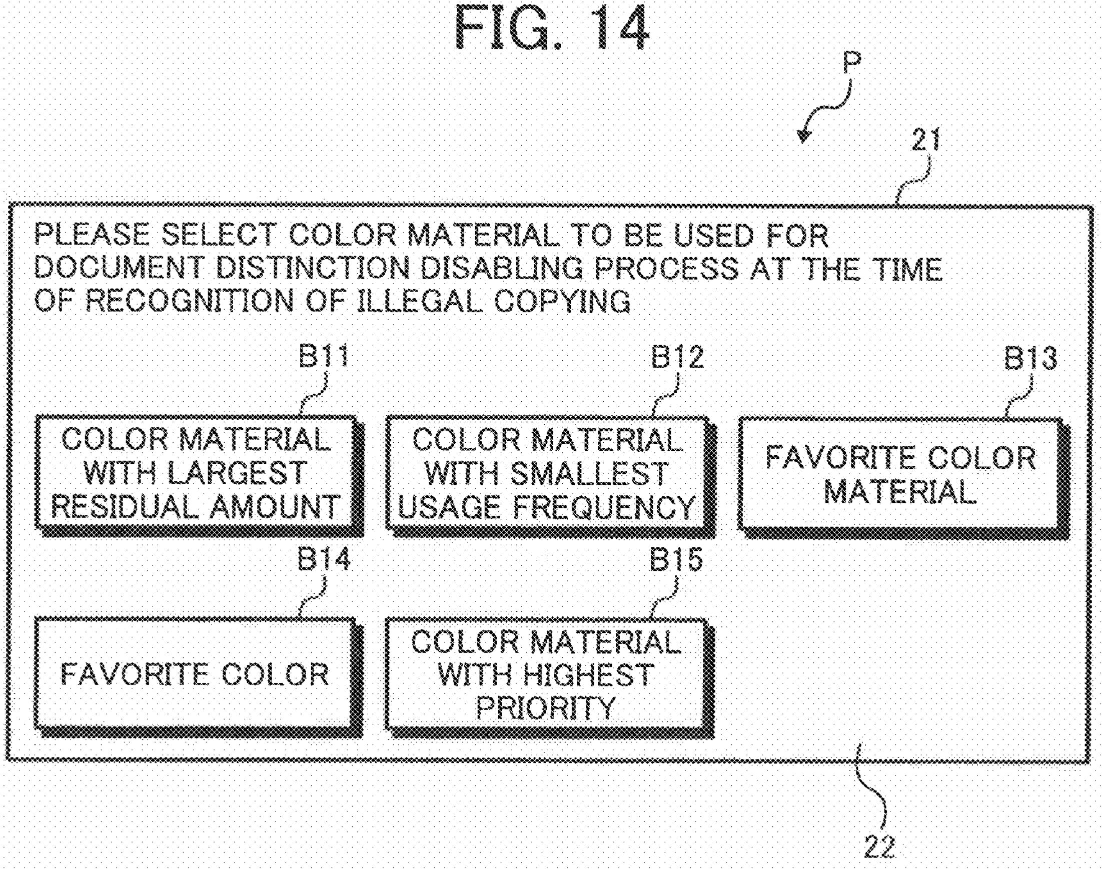
FIG. 14 is a plan view of an example of a selection screen for selecting a method of selecting a color material color to be used for the document distinction disabling process on an operation panel according to a fifth embodiment.

A fifth embodiment of the present invention is explained with reference to FIG. 14. Components identical with those in the first to the fourth embodiments are denoted by the identical reference numerals and signs. Explanation of the components is omitted. This embodiment enables selecting the various methods of selecting a color of a color material used for the document distinction disabling process explained in the first to the fourth embodiments according to an intension of a user.

The operation panel control device 4 in this embodiment notifies the system controller 2 of a color material selected according to a method of selecting a color material color to be used for the document distinction disabling process designated by the user via the operation panel P (a selection method selecting unit). FIG. 14 is a plan view of an example of a selection screen for selecting a method of selecting a color material color to be used for the document distinction disabling process on the operation panel P. As shown in FIG. 14, the display device 22 of the operation panel P displays, on the selection screen, buttons B11 to B15 for designating a method of selecting a color material color to be used for the document distinction disabling process explained in the first to the fourth embodiments. The user selects a method of selecting a color material color to be used for the document distinction disabling process via the input device 21 serving as a touch panel.

When the button B11 is operated, the operation panel control device 4 notifies the system controller 2 that the user selected the method of selecting a color material with a largest toner residual amount. The system controller 2 receives the notification, and notifies the image reading unit 27, which performs the color selection process in the document distinction disabling process, of the color material with a largest toner residual amount.

When the button B12 is operated, the operation panel control device 4 notifies the system controller 2 that the user selected the method of selecting a color material with a smallest usage frequency. The system controller 2 receives the notification, and notifies the image reading unit 27, which performs the color selection process in the document distinction disabling process, of the color material with a smallest usage frequency.

When the button B13 is operated, the operation panel control device 4 notifies the system controller 2 that the user selected the method of selecting the user's favorite color material. The system controller 2 receives the notification, and notifies the image reading unit 27, which performs the color selection process in the document distinction disabling process, of the user's favorite color material.

When the button B14 is operated, the operation panel control device 4 notifies the system controller 2 that the user selected the method of selecting the user's favorite color. The system controller 2 receives the notification, and notifies the image reading unit 27, which performs the color selection process in the document distinction disabling process, of the user's favorite color.

When the button B15 is operated, the operation panel control device 4 notifies the system controller 2 that the user selected the method of selecting a color material with a highest priority. The system controller 2 receives the notification, and notifies the image reading unit 27, which performs the color selection process in the document distinction disabling process, of the priority of color material color selection stored in the NVRAM 9.

According to this embodiment, the user is made to select a method of selecting a color material color to be used for the document distinction disabling process. Thus, it is possible to improve a degree of freedom of the user.

In the respective embodiments, a part of the processing is executed by hardware resources of a digital circuit configuration. However, the present invention is not limited to this. A series of processing for detecting and judging that reproduction of a document is prohibited (a reproduction prohibition document detecting unit), selecting a color material color (a color material color selecting unit), and prohibiting copying of the document according to the document distinction disabling process (a document distinction disabling processing unit) may be executed by a computer program installed in the hardware resources of the digital color multifunction device 1.

According to an aspect of the present invention, offset of a color material usage amount can be reduced by enabling selection of a color to be used in the document distinction disabling process.

According to another aspect of the present invention, further restraint on copying a confidential document is possible.

According to still another aspect of the present invention, it is possible to improve a degree of freedom of the user.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that generates image data based on an input image of a document read by an image reading unit, and sends the image data to an image forming unit that forms an output image using a plurality of color materials, the image processing apparatus comprising:

a detecting unit that detects, from the image data of the document, whether reproduction of the document is prohibited;

a color material selecting unit that selects a color material to be used in a document distinction disabling process that is applied to the image data to inhibit reproduction of the document;

a document distinction disabling processing unit that applies the document distinction disabling process to the image data using selected color material, if it is detected that reproduction of the document is prohibited; and an image data outputting unit that outputs, to the image forming unit, the image data subjected to the document distinction disabling process.

2. The image processing apparatus according to claim 1, wherein the color material selecting unit selects the color material based on a predetermined priority of color material selection and a print mode of the image forming unit.

3. The image processing apparatus according to claim 1, further comprising:

a residual amount notification receiving unit that receives, from the image forming unit, a notification of residual amount of each color material; and a largest residual amount color material acquiring unit that acquires a color material with a largest residual amount out of the color materials whose residual amount is received; wherein the color material selecting unit selects a color material with the largest residual amount.

4. The image processing apparatus according to claim 1, further comprising:

a usage frequency notification receiving unit that receives, from the image forming unit, a notification of usage frequency of each color material; and a smallest frequency color material acquiring unit that acquires a color material with a smallest usage frequency out of the color materials whose usage frequency is received; wherein the color selecting unit selects a color material with the smallest usage frequency.

5. The image processing apparatus according to claim 1, further comprising:

a first selecting unit that makes a user select a desired color material out of the color materials in the image forming unit;

a first notification receiving unit that receives a notification of the desired color material selected; and a first acquiring unit that acquires the desired color material; wherein the color selecting unit selects the desired color material.

6. The image processing apparatus according to claim 1, further comprising:

a second selecting unit that makes a user select a desired color that can be formed using at least one of the color materials in the image forming unit;

a second notification receiving unit that receives a notification of color materials necessary for forming the desired color; and a second acquiring unit that acquires the color materials necessary for forming the desired color; wherein the color selecting unit selects the color materials necessary for forming the desired color.

7. The image processing apparatus according to claim 1, wherein the color material selecting unit selects a color material according to any one of a plurality of selection methods, and further comprising:

a selection method choosing unit that makes a user choose a selection method for selecting the color material to be used in the document distinction disabling process.

8. An image forming apparatus comprising:

an image forming unit that forms an output image with a plurality of color materials;

an image reading unit that reads an input image of a document to generate image data;

a detecting unit that detects, from the image data of the document, whether reproduction of the document is prohibited;

a color material selecting unit that selects a color material to be used in a document distinction disabling process that is applied to the image data to inhibit reproduction of the document;

a document distinction disabling processing unit that applies the document distinction disabling process to the image data using selected color material, if it is detected that reproduction of the document is prohibited; and an image data outputting unit that outputs, to the image forming unit, the image data subjected to the document distinction disabling process.

9. The image forming apparatus according to claim 8, wherein the color material selecting unit selects the color material based on a predetermined priority of color material selection and a print mode of the image forming unit.

10. The image forming apparatus according to claim 8, further comprising:

a residual amount notification receiving unit that receives, from the image forming unit, a notification of residual amount of each color material; and a largest residual amount color material acquiring unit that acquires a color material with a largest residual amount out of the color materials whose residual amount is received; wherein the color material selecting unit selects a color material with the largest residual amount.

11. The image forming apparatus according to claim 8, further comprising:

a usage frequency notification receiving unit that receives, from the image forming unit, a notification of usage frequency of each color material; and a smallest frequency color material acquiring unit that acquires a color material with a smallest usage frequency out of the color materials whose usage frequency is received; wherein the color selecting unit selects a color material with the smallest usage frequency.

12. The image forming apparatus according to claim 8, further comprising:

a first selecting unit that causes a user to select a desired color material out of the color materials in the image forming unit;

a first notification receiving unit that receives a notification of the desired color material selected; and a first acquiring unit that acquires the desired color material; wherein the color selecting unit selects the desired color material.

13. The image forming apparatus according to claim 8, further comprising:

a second selecting unit that causes a user to select a desired color that can be formed using at least one of the color materials in the image forming unit;

a second notification receiving unit that receives a notification of color materials necessary for forming the desired color; and a second acquiring unit that acquires the color materials necessary for forming the desired color; wherein the color selecting unit selects the color materials necessary for forming the desired color.

14. The image forming apparatus according to claim 8, wherein the color material selecting unit selects a color material according to any one of a plurality of selection methods, and further comprising:

a selection method choosing unit that makes a user choose a selection method for selecting the color material to be used in the document distinction disabling process.

15. A computer-readable recording medium that records thereon a computer program for an image processing apparatus that forms an output image of a document using a plurality of color materials, the computer program including instructions which, when executed, causes a computer to execute the steps of:

reading an input image of a document to generate image data;

detecting, from the image data of the document, whether reproduction of the document is prohibited;

selecting a color material to be used in a document distinction disabling process that is applied to the image data to inhibit reproduction of the document;

applying the document distinction disabling process to the image data using selected color material, if it is detected that reproduction of the document is prohibited; and outputting the image data subjected to the document distinction disabling process to an image forming unit that forms the output image of the image data.

16. The recording medium according to claim 15, wherein the step of selecting is performed based on a predetermined priority of color material selection and a print mode of the image forming unit.

17. The recording medium according to claim 15, further comprising:

receiving, from the image forming unit, a notification of residual amount of each color material; and acquiring a color material with a largest residual amount out of the color materials whose residual amount is received; wherein the step of selecting includes selecting a color material with the largest residual amount.

18. The recording medium according to claim 15, further comprising:

receiving, from the image forming unit, a notification of usage frequency of each color material; and acquiring a color material with a smallest usage frequency out of the color materials whose usage frequency is received; wherein the step of selecting includes selecting a color material with the smallest usage frequency.

19. The recording medium according to claim 15, further comprising:

making a user select a desired color material out of the color materials in the image forming unit;

receiving a notification of the desired color material selected; and acquiring the desired color material; wherein the step of selecting includes selecting the desired color material.

20. The recording medium according to claim 15, further comprising:

making a user select a desired color that can be formed using at least one of the color materials in the image forming unit;

receiving a notification of color materials necessary for forming the desired color; and acquiring the color materials necessary for forming the desired color; wherein the step of selecting includes selecting the color materials necessary for forming the desired color.

21. The recording medium according to claim 15, wherein the step of selecting includes selecting a color material according to any one of a plurality of selection methods, and further comprising:

making a user choose a selection method for selecting the color material to be used in the document distinction disabling process.

* * * * *